US011854242B2

(12) United States Patent
Stoppa et al.

(10) Patent No.: US 11,854,242 B2
(45) Date of Patent: Dec. 26, 2023

(54) SYSTEMS AND METHODS FOR PROVIDING PERSONALIZED SALIENCY MODELS

(71) Applicant: Apple Inc., Cupertino, CA (US)

(72) Inventors: Michele Stoppa, Sunnyvale, CA (US); Mohamed Selim Ben Himane, Milpitas, CA (US); Raffi A. Bedikian, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 153 days.

(21) Appl. No.: 17/448,456

(22) Filed: Sep. 22, 2021

(65) Prior Publication Data

US 2022/0092331 A1  Mar. 24, 2022

Related U.S. Application Data

(60) Provisional application No. 63/082,259, filed on Sep. 23, 2020.

(51) Int. Cl.
*G06V 10/46* (2022.01)
*G06V 30/262* (2022.01)
(Continued)

(52) U.S. Cl.
CPC ............ *G06V 10/462* (2022.01); *G06F 18/21* (2023.01); *G06V 10/40* (2022.01); *G06V 30/274* (2022.01)

(58) Field of Classification Search
CPC .... G06V 10/462; G06V 10/40; G06V 30/274; G06V 10/25; G06V 10/768; G06V 20/20;
(Continued)

(56) References Cited

U.S. PATENT DOCUMENTS

| 7,127,081 B1 * | 10/2006 | Erdem ................. G06V 40/161 348/169 |
| 2008/0304708 A1 * | 12/2008 | Le Meur .............. G06V 10/462 382/107 |

(Continued)

FOREIGN PATENT DOCUMENTS

AU       2012261494 A1 *  6/2014

OTHER PUBLICATIONS

Author Unknown, "Stochastic Gradient Descent", Wikipedia, Version from Sep. 21, 2020 (Year: 2020).*

(Continued)

*Primary Examiner* — Aaron W Carter
(74) *Attorney, Agent, or Firm* — Blank Rome LLP

(57) ABSTRACT

Methods, systems, and computer readable media for providing personalized saliency models, e.g., for use in mixed reality environments, are disclosed herein, comprising: obtaining, from a server, a first saliency model for the characterization of captured images, wherein the first saliency model represents a global saliency model; capturing a first plurality of images by a first device; obtaining information indicative of a reaction of a first user of the first device to the capture of one or more images of the first plurality images; updating the first saliency model based, at least in part, on the obtained information to form a personalized, second saliency model; and transmitting at least a portion of the second saliency model to the server for inclusion into the global saliency model. In some embodiments, a user's personalized (i.e., updated) saliency model may be used to modify one or more characteristics of at least one subsequently captured image.

20 Claims, 6 Drawing Sheets

(51) Int. Cl.
*G06F 18/21* (2023.01)
*G06V 10/40* (2022.01)

(58) Field of Classification Search
CPC ........ G06V 20/70; G06F 18/21; G06N 20/00; G06N 3/08
See application file for complete search history.

(56) References Cited

U.S. PATENT DOCUMENTS

| | | | | |
|---|---|---|---|---|
| 2010/0322521 | A1* | 12/2010 | Tal | G06T 11/60 382/199 |
| 2016/0358035 | A1* | 12/2016 | Ruan | G06F 18/2415 |
| 2016/0360267 | A1* | 12/2016 | Marilly | H04N 21/44008 |
| 2018/0018590 | A1* | 1/2018 | Szeto | G06N 20/10 |
| 2020/0074234 | A1* | 3/2020 | Tong | G06V 10/774 |
| 2020/0130578 | A1* | 4/2020 | Murakami | B60K 35/00 |
| 2020/0311520 | A1* | 10/2020 | Zhao | G06V 10/764 |
| 2021/0049296 | A1* | 2/2021 | Blandin | G06N 20/00 |
| 2022/0092331 | A1* | 3/2022 | Stoppa | G06V 10/40 |

OTHER PUBLICATIONS

Xu et al., "Personalized Saliency and Its Prediction", IEEE, Dec. 2019 (Year: 2019).*

Xu et al., "Beyond Universal Saliency: Personalized Saliency Prediction with Multi-task CNN", Proceeding of the Twenty-Sixth International Joint Conference on Artificial Intelligence (Year: 2017).*

Google AI Blog, "Federated Learning: Collaborative Machine Learning without Centralized Training Data," Apr. 6, 2017, Retrieved from the Internet: URL: https://ai.googleblog.com/2017/04/federated-learning-collaborative.html [Retrieved on Aug. 4, 2020].

Beery, et al., "Context R-CNN: Long Term Temporal Context for Per-Camera Object Detection," arXiv: 1912.03538v3, Apr. 22, 2020.

* cited by examiner

SYSTEMS AND METHODS FOR PROVIDING PERSONALIZED SALIENCY MODELS

BACKGROUND

This disclosure relates generally to saliency models. More particularly, but not by way of limitation, this disclosure relates to techniques for automatically learning and improving personalized saliency models for users, e.g., in the context of a mixed reality (MR) computing environment.

With the proliferation of camera-enabled mobile devices, users can capture numerous photos, video, and/or audio of any number of people and objects in many different settings and geographic locations. For example, a user may take and store hundreds of photos and other media items on their mobile device. However, difficulties can arise in determining what portions of an image or other obtained content are important, or "salient" to a viewer of the image. For example, image processing or other application behavior determination operations (e.g., in a mixed reality system environment) often may benefit from determining what portion(s) of an image or other content a user might find relevant or important to their understanding or appreciation of the content that they are experiencing.

However, to date, most saliency models have been trained on large training sets of global data, e.g., data representing the content collected and/or experienced by large numbers of users representing diverse backgrounds, ages, cultures, geographic locations, etc. Thus, so-called "global" saliency models, i.e., saliency models formed as a combination of at least two or more other saliency models (e.g., saliency models developed by two or more individual users or groups of users), may not accurately reflect an individual user's personalized views on what constitutes salient content.

Thus, it would be beneficial to provide users with an ability to generate, train, update, and/or share back with a community of users (in a secure and privacy-respectful fashion) their "personalized" saliency models, i.e., saliency models that more closely reflect an individual user's personalized views on what constitutes salient content, developed over time—and as the user reacts to (or annotates) their own personal training data and content that is acquired over time.

Moreover, by allowing multiple users to simultaneously train and share back their personalized saliency models with the larger community of users, it may be possible to develop more accurate and sophisticated global saliency models over time—as well as global saliency models that are targeted towards use by a particular demographic group, profession, activity, and/or certain geographic region of user, etc.

SUMMARY

Methods, systems, and computer readable media for providing personalized saliency models, e.g., for use in mixed reality environments, are disclosed herein, comprising: obtaining, from a server, a first saliency model for the characterization of captured images, wherein the first saliency model represents a global saliency model; capturing a first plurality of images by a first device; obtaining information indicative of a reaction of a first user of the first device to the capture of one or more images of the first plurality images; updating the first saliency model based, at least in part, on the obtained information to form a personalized, second saliency model; and transmitting at least a portion of the second saliency model to the server for inclusion into the global saliency model. In some embodiments, a user's personalized (i.e., updated) second saliency model may be used to modify one or more characteristics of at least one subsequently captured image.

In other embodiments, further methods, systems, and computer readable media for providing personalized saliency models, e.g., for use in mixed reality environments, are disclosed herein, comprising: transmitting from a server, to a first device, a first saliency model for the characterization of captured images, wherein the first saliency model represents a global saliency model; receiving from each of two or more user devices, over a network, at least a portion of an updated version of the first saliency model, wherein the updates to the updated versions of the first saliency model are based, at least in part, on reactions of respective users of the two or more user devices to images captured by the respective user devices of the respective users; modifying the first saliency model based, at least in part, on the received at least portions of the updated versions of the first saliency model, to form a second saliency model; and transmitting at least a portion of the second saliency model to at least one of the two or more user devices.

In some embodiments, the output of a saliency model may comprise a multi-dimensional saliency map, wherein the extra dimensions may provide extra information or context as to why certain portions of an image may be salient, e.g., either in a given situation or to a given user. This additional information may provide a richer context for the user device to be able to take or suggest certain actions, e.g., based on a scenario or scene that a user is currently viewing. In still other embodiments, a saliency model may be updated using a supervised learning technique(s), wherein at least one dimension of the multi-dimensional saliency map has a known semantic meaning.

DETAILED DESCRIPTION

Figure 1:
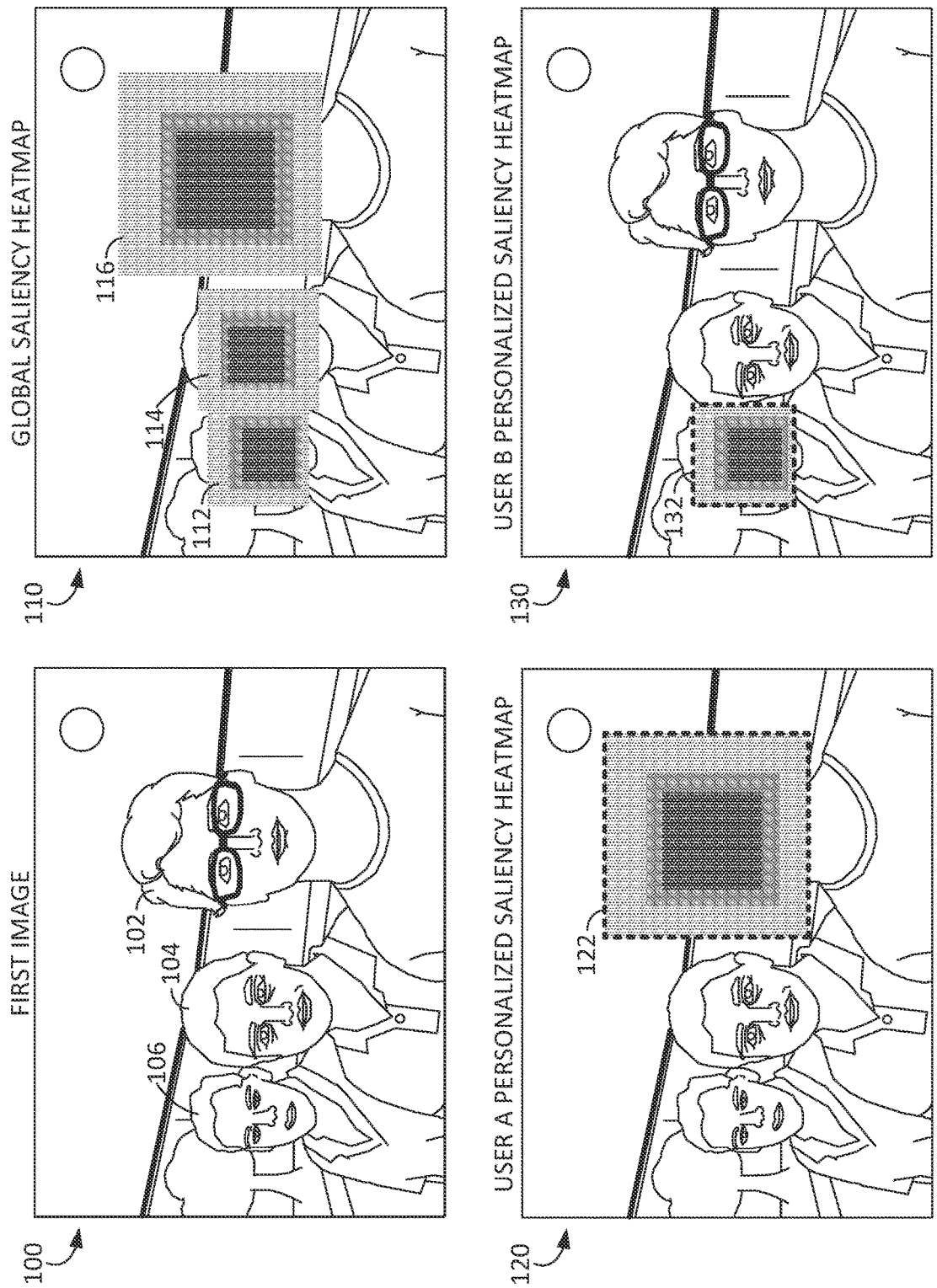
FIG. 1 shows exemplary saliency heatmaps produced by global and/or personal saliency models, according to one or more embodiments.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart.

Moreover, the language used in this disclosure has been principally selected for readability and instructional purposes and may not have been selected to delineate or circumscribe the inventive subject matter, resort to the claims thus being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming—but would nevertheless be a routine undertaking for those of ordinary skill in the design and implementation of graphics modeling systems having the benefit of this disclosure.

As alluded to above, saliency models may have many potentially beneficial uses in personal electronic device computing contexts, e.g., ranging from predicting user eye movements, to security systems, medical devices, automated vehicles, Internet of Things (IoT) devices, accessibility applications, and machine learning applications of many kinds. Personalized saliency models, i.e., global saliency models that have been further trained based on an individual user's particular preferences and/or reactions to input data over time, have even further potential to identify and present highly-relevant and contextually-appropriate salient information to users of such personal electronic devices.

In a mixed reality computing environment, for example, the application of personalized saliency models may be used to highlight or annotate augmented/virtual scenes and/or present notifications to a user in a customized and dynamic fashion. Saliency models are typically trained to recognize and/or annotate region(s) within captured data (e.g., images) that would typically be the most important, relevant, and/or deserving of a general viewer's attention. According to the embodiments disclosed herein, population-level, e.g., global, saliency models could be further refined and personalized over time based on a particular user's reaction and indicated preferences, e.g., within the mixed reality environment. If desired, portions of individual users' personalized saliency models could also be contributed back to the population-level, i.e., global, saliency model over time, e.g., in a secure and highly-anonymized privacy-respectful fashion, in order to help improve and/or customize such global saliency models.

Definitions

The following definitions may pertain to the subject matter described herein.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands).

A person may sense and/or interact with a XR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects. Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Exemplary Hardware

There are many different types of electronic systems that enable a person to sense and/or interact with various XR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Exemplary Personalized Saliency Models

Referring now to FIG. 1, exemplary saliency heatmaps produced by global and/or personal saliency models are illustrated, according to one or more embodiments. A first image 100 will be used as a sample image to discuss the various techniques presented herein. As may be seen, first image 100 is a rectangular, landscape-oriented image that includes various human subjects 102/104/106 positioned from left to right across the extent of the image. First Image 100 also reflects an outdoor scene, wherein the background of the human subjects includes various objects, such as a wall, a tree, the moon, etc.

As mentioned above, some systems and methods may benefit from understanding which portions of a captured image(s) contain the content that is likely to be important, relevant, or otherwise salient to the user. Once such a determination is made, it may be desirable to modify the captured image(s) (or subsequently captured images) or take other actions, based on the determination of the salient portions of the images, as will be described in greater detail below with respect to FIG. 2).

In some embodiments, a saliency heatmap, such as exemplary saliency heatmap 110 in FIG. 1, may be utilized to identify salient portions of the image, e.g., in the form of generated bounding box(es), wherein the bounding boxes may be configured to enclose the salient objects and/or regions in an image where a user's attention or eye gaze is most likely to be directed when looking at the image. For purposes of this description, a salient object or salient region refers to a portion of potential interest in an image, and a saliency value refers to a likelihood that a particular pixel belongs to a salient object or region within the image.

A saliency heat map may provide a binary determination for each pixel in an image (e.g., a value of '0' for a non-salient pixel, and a value of '1' for a salient pixel). In other cases, as illustrated in exemplary saliency heatmap 110 in FIG. 1, there may be continuous saliency scores assigned to each pixel that cover a range of potential score values, e.g., from a score of 0% up to 100%. For example, the smallest dark squares centered over the faces of the human subjects in saliency heatmap 110 may represent regions of pixels having a saliency score of 60% or greater. The next larger square over each human subject's face, having slightly lighter coloration, may represent regions of pixels having a saliency score of 50% or greater. Finally, the outermost, largest square over each human subject's face, having the lightest coloration, may represent regions of pixels having a saliency score of 15% or greater. Regions in saliency heatmap 110 that are not covered by a box in this example may simply represent regions of pixels having a saliency score of lower than 15%, i.e., regions of the image that are not very likely to have interesting or important content in them (from a "global" standpoint) that an average user would be likely to find essential or important. It is to be understood that the saliency heatmap may alternatively be generated on a downsampled image, such that each portion of pixels in the original image is given an estimated saliency value in the heatmap, if desired for a given implementation.

As will be described in further detail below, according to some embodiments, rather than a simple 2D heatmap (which may, e.g., be stored as a 1D vector of saliency score values), other, more complex, multi-dimensional saliency heatmaps may be produced by trained saliency models, e.g., such that additional temporal and/or personalized contextual factors may be imputed to the saliency model. In some cases, the output channels of a system employing such trained saliency models could also be annotated, e.g., in real-time or near-real-time, to disambiguate between potential hazards that may be in a user of the system's environment.

According to some embodiments, a saliency model used to generate the saliency heatmap 110 may include a globally trained saliency model, by which the saliency of an object may be predicted for an image. In one or more embodiments, the saliency model may be trained with still image data or video data and may be trained to predict the salience of various objects in the image across a global population of users in a class-agnostic manner. That is, the particular person viewing the image and/or the type of object in the image may be irrelevant to the saliency model's determinations of whether or not a particular object is salient. Further, the saliency model may be trained on RGB image data, and/or RGB+Depth image data. According to one or more embodiments, by incorporating depth into the training data, more accurate saliency heatmaps may possibly be generated. As an example, depth may be used to identify object boundaries, layout of the scene, and the like. As mentioned above, in some embodiments, saliency heatmap 110 may reflect the output of globally trained saliency model, i.e., a saliency model trained on a large set of global training data, and may typically be trained and computed offline and/or by very powerful computing devices or node clusters, such that the trained model may be distributed to individual users for their use in identifying salient portions of images, if so desired, without the individual users having to perform computationally expensive machine learning and training operations over large data sets.

In one or more embodiments, such as those described in the commonly-assigned, co-pending U.S. patent application Ser. No. 16/848,315 (hereinafter, "the '315 application," which is hereby incorporated by reference in its entirety), the saliency model may incorporate, or feed into, a bounding box neural network, which may be used to predict the optimal dimensions and/or locations of the saliency bounding box(es).

In other embodiments, such as shown in saliency heatmap 120, a personally trained saliency model (corresponding to a hypothetical "User A") may be used to predict the saliency of objects in a captured image or video. In one or more embodiments, the personal saliency model may be constructed by modifying, improving, or otherwise updating a global saliency model, e.g., as received from a network device (e.g., network device 550, as will be described in further detail with reference to FIG. 5, below), using a particular user's own personalized training data and their reaction thereto (which may be used by a training module on the particular user's electronic device to infer which objects, portions, peoples, contexts, situations, etc., the particular user found to be salient). That is, the particular person viewing the image and/or the type of object in the image may play a role in the personalized saliency model's coming to a different determination or characterization of the salient portions of the captured image than a global saliency model would come to. For example, as shown by bounding box 122 in saliency heatmap 120, the personalized saliency model of User A has produced a different saliency heatmap than the global saliency heatmap shown in saliency heatmap 110. This may be reflective, e.g., of the fact that User A may be a close contact or friend with human subject 102 in first image 100, but not know or have any contacts in common with human subjects 104 and 106 in first image 100 of FIG. 1. As such, User A's personalized saliency model may identify only human subject 102 as being a salient portion of first image 100 (as indicated by bounding box 122).

Likewise, as shown in saliency heatmap 130, a personally-trained saliency model corresponding to a different user (i.e., a hypothetical "User B") may produce yet a third saliency heat map that is different from both the global saliency heatmap 110 and the personalized saliency heatmap 120 corresponding to User A. In particular, saliency heatmap 130 may be reflective, e.g., of the fact that User B may be a close contact or friend with human subject 106 in first image 100, but not know or have any contacts in common with human subjects 102 and 104 in first image 100 of FIG. 1. As such, User B's personalized saliency model may identify only human subject 106 as being a salient portion of first image 100 (as indicated by bounding box 132). It is to be understood that the use of facial recognition as a proxy for identifying the salient portions of an image, as well as the specific use of 2D saliency heatmaps as the indications of such salient portions in FIG. 1, are purely for illustrative purposes. Saliency may be based on any number of other factors (including contextual and/or temporal factors), and the representations of saliency produced by trained global and/or personalized saliency models may comprise multi-dimensional vectors conveying a more rich and nuanced understanding of what portions of the images are likely to be salient than a 2D heatmap (and even why such regions my be salient, in a given context).

Figure 2:
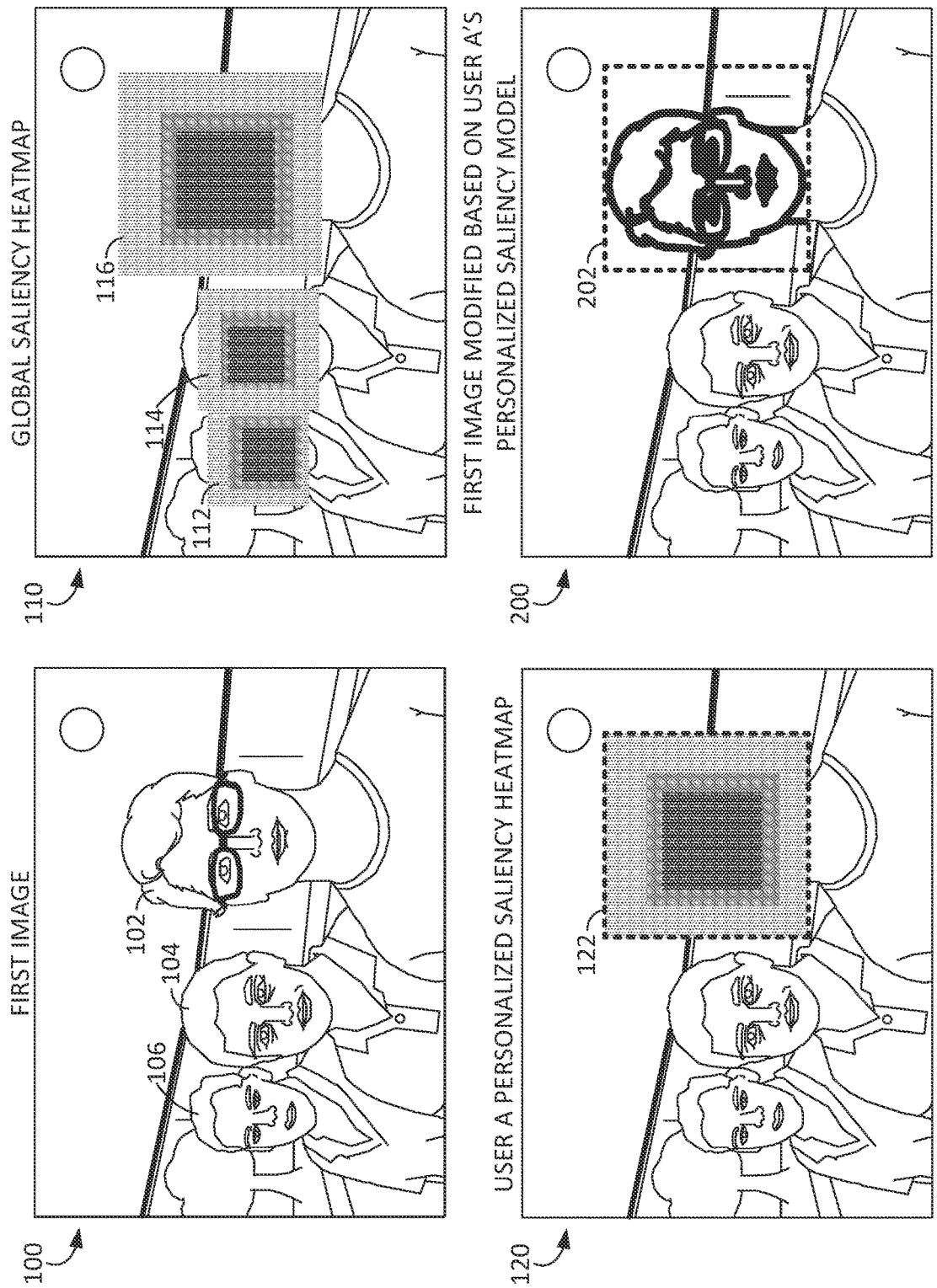
FIG. 2 shows exemplary image modifications made based on output from personal saliency models, according to one or more embodiments.

Referring now to FIG. 2, exemplary image modifications made based on output from personal saliency models are illustrated, according to one or more embodiments. In some embodiments, such as shown in image 200, a first image (100) may be modified based on a particular user, e.g., User A's, personalized saliency model (whose output is reflected in personalized saliency heatmap 120). As mentioned above, in this example, User A may be a close contact or friend with human subject 102 in first image 100, but not know or have any contacts in common with human subjects 104 and 106 in first image 100. As such, User A's personalized saliency model may identify only human subject 102 as being a salient portion of first image 100 (as indicated by bounding box 122).

Thus, in some embodiments, it may beneficial to emphasize or otherwise draw a user's attention to the identified salient portions of a captured image. As shown in FIG. 2 by bounding box 202, the portion of first image 100 corresponding to bounding box 122 (i.e., the face of human subject 102) has been highlighted or otherwise emphasized to draw the user's attention. Such a modification of first image 100 may, e.g., trigger a notification to remind a user to say "hello" to or send another form of communication (e.g., a message, email, invitation, etc.) to human subject 102. As illustrated in FIG. 2, it is also possible to 'de-emphasize' the less salient (or non-salient) portions of the first image 100, as illustrated by the dimming or otherwise de-emphasis on the portions of first image 100 outside of bounding box 122, so that the user's attention may remain more focused on the salient portions of the first image 100 within bounding box 122, i.e., human subject 102, in this example.

Other techniques for emphasizing (or de-emphasizing) portions of a captured image, video, audio, etc., e.g., based on their respective saliency will also become apparent. For example, portions of the image, video, and/or audio data could be modified by, e.g. adding contextual information, adding visual highlighting, adding stylization, changing one or more of a color or brightness component of the image, adding blurring, compressing (or storing at a higher resolution) portions of the image, video, or audio based on respective saliency, etc. In some cases, actions may also be taken by the system, based on the output of the saliency model(s), e.g., triggering notifications or warnings, or contacting emergency services on behalf of a user, etc.

Device-Side Creation and Updating of Personalized Saliency Models

Figure 3:
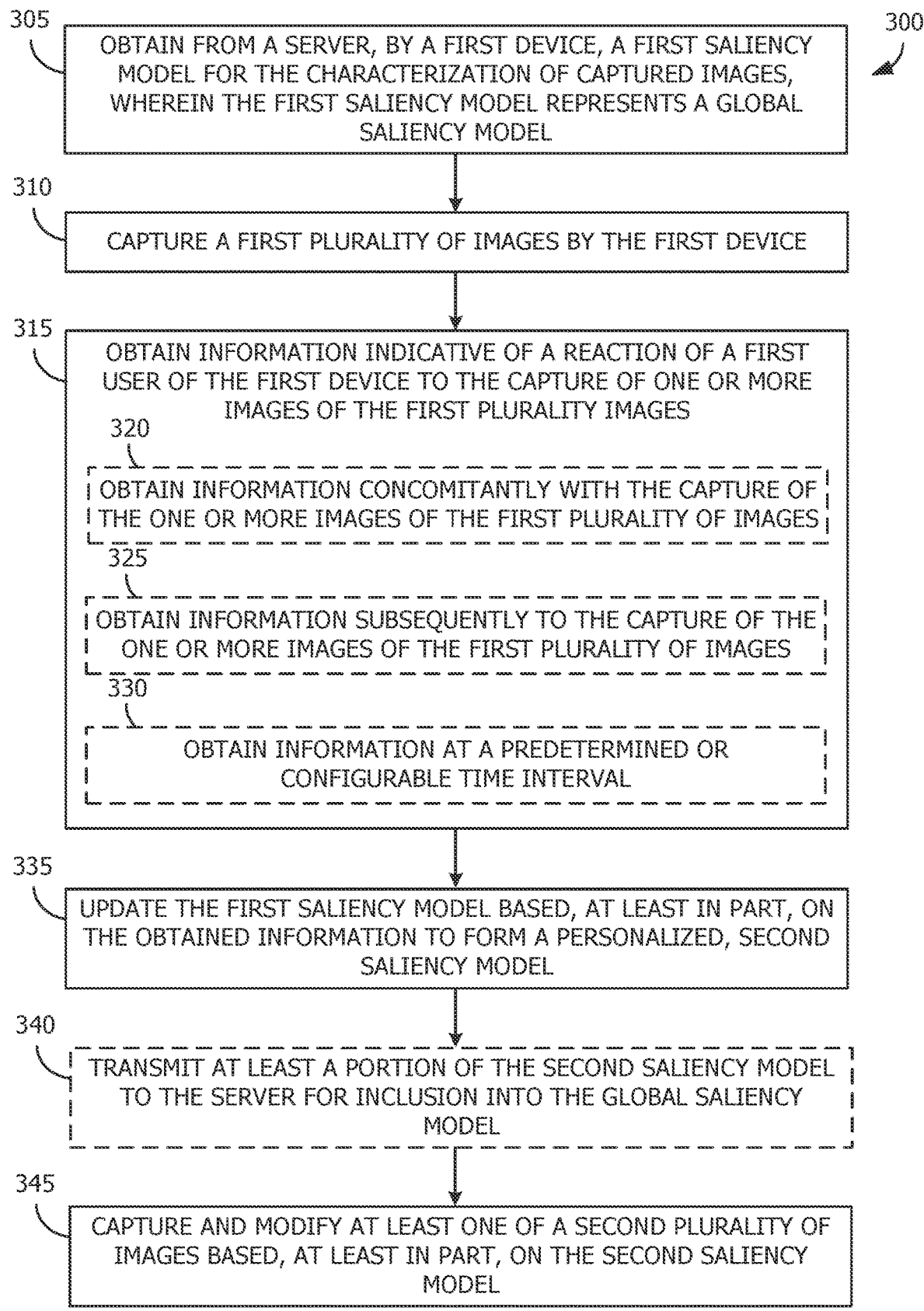
FIG. 3 shows a flowchart in which a personalized saliency model is provided at a user device, according to one or more embodiments.

Referring now to FIG. 3, a flowchart 300 is illustrated, in which a personalized saliency model is provided at a user device, according to one or more embodiments. Although the various processes depicted in FIG. 3 are illustrated in a particular order, it should be understood that the various processes may be performed in a different order. Further, not all the processes may be necessary to be performed to build or train the personalized saliency models described herein. For purposes of explanation, the various processes may be described or thought of as taking place in the context of the components of FIG. 5, while will be described in further detail below, however, it should be understood that the various processes may be performed by additional or alternative components.

The method 300 begins at Step 305, where a first device may obtain, from a server, a first saliency model for the characterization of captured images, wherein the first saliency model represents a global saliency model. Next, at Step 310, the first device may capture a first plurality of images. Next, at Step 315, the first device may obtain information indicative of a reaction of a first user of the first device to the capture of one or more images of the first plurality images. For example, in some instances, the information indicate of the first user's reaction may be obtained: concomitantly with the capture of the one or more images of the first plurality of images (Step 320); subsequently to the capture of the one or more images of the first plurality of images (Step 325); or at a predetermined or configurable time interval (Step 330). Examples of potential types of reactions of the first user of the first device to the capture of at least one of the one or more images of the first plurality images may comprise at least one of the following: a change in heart rate; a change in stress level; an emotional reaction; a change in eye gaze location; a change in body temperature; a change blood pressure; an interaction with a user interface element of the first device; or a verbal utterance.

Next, the method 300 may proceed to Step 335, wherein the first device may update the first saliency model based, at least in part, on the obtained information to form a personalized, second saliency model. In some embodiments, updating the first saliency model may further comprise updating the first saliency model using a long term attention module. A long term attention module may comprise one or more network architecture components designed to take advantage of long-range dependencies in data (e.g., relationships between data that may be spatially and/or temporally far from each other in the training data). As used herein, the term "long term attention module" will refer specifically to a programmable code module configured to make saliency determinations for a given image based, at least in part, on information obtained from a source other than the given image itself.

In other embodiments, as opposed to a 1D array or 2D saliency heatmap (such as those described in FIGS. 1 and 2, above), the output of the first saliency model may comprise a multi-dimensional saliency map, e.g., a high-dimensional saliency map, wherein the extra dimensions may provide extra information or context as to why certain portions of an image may be salient, e.g., either in a given situation or to a given user. This additional information may provide a richer context for the user device to be able to take or suggest certain actions, based on a scenario or scene that a user is currently viewing. In still other embodiments, updating the first saliency model may comprise using a supervised learning technique(s), wherein at least one dimension of the multi-dimensional saliency map has a known or understandable semantic meaning. For example, with supervised learning in a feature vector space, each vector dimension could be designed to have some human-understandable semantic meaning (e.g., dimensions of the vector that correspond to changes in a user's heart rate or blood pressure may correspond to likely stressful scene content, whereas dimensions of the vector that correspond to changes in a user's eye gaze may correspond to likely salient scene content, and so forth).

At Step 340, the first device may optionally transmit at least a portion of the second saliency model to the server for inclusion into the global saliency model (e.g., if the user of the first device has opted-in to sharing data—or obfuscated versions of their data—back with the server(s) maintaining the global saliency model(s)). In some embodiments, the transmitted portion may comprise only the small, so-called "diff" or "delta" files, encapsulating the updates and modifications made by the user to the global version of the saliency model. In some embodiments, an appropriateness detector may be applied to the portion of the second saliency model before being transmitted to the server. The appropriateness detector may, e.g., take the form of one or more object detectors, classifiers, neural networks, support vector machines (SVMs), rule sets, character recognizers, etc., and be used to determine either a 'binary' appropriateness decision (i.e., "appropriate" or "not appropriate" for submission), or some form of appropriateness score, which may be used to either automatically (or with input from a user) determine whether certain information (e.g., private information, personally-sensitive information, confidential information, etc.) is appropriate for transmission to the server. In other embodiments, some form of noise (e.g., modifications to intentionally obfuscate the "true" values of the underlying data, so as to still allow the data to retain some useful value, but without revealing personally-sensitive and/or user-specific information) may be added to the portion of the second saliency model before being transmitted to the server, such that the portion of the second saliency model is altered in some way, so as to make it more difficult (if not impossible) to determine the original source of the portion of the second saliency model being transmitted to the server.

At Step 345, the first device may capture a second plurality of images and then modify at least one of the second plurality of images based, at least in part, on the second saliency model. According to some implementations, modifying at least one of the second plurality of images comprises performing at least one of the following operations on the at least one of the second plurality of images comprises: adding contextual information; adding visual highlighting; adding stylization; changing one or more of a color or brightness component; blurring; compressing; emphasizing; or deemphasizing. In some embodiments, the first device may also obtain, from the server, a third saliency model for the characterization of captured images, wherein the third saliency model represents an updated global saliency model with respect to the first saliency model. As may be understood, the third saliency model may be updated based on portions of updated saliency models transmitted from one or more other user devices at an earlier point in time. The third saliency model may then likewise be further updated (e.g., via further usage by a user and/or by being combined or blended with at least a portion of the user's personalized saliency model, i.e., assuming that the global saliency model and the user's personalized saliency model share the same embedding) and used to modify subsequently captured images. [Dashed line boxes, as used herein, indicate that a particular step or feature is optional in a given process.]

Server-Side Creation and Updating of Global Saliency Models

Figure 4:
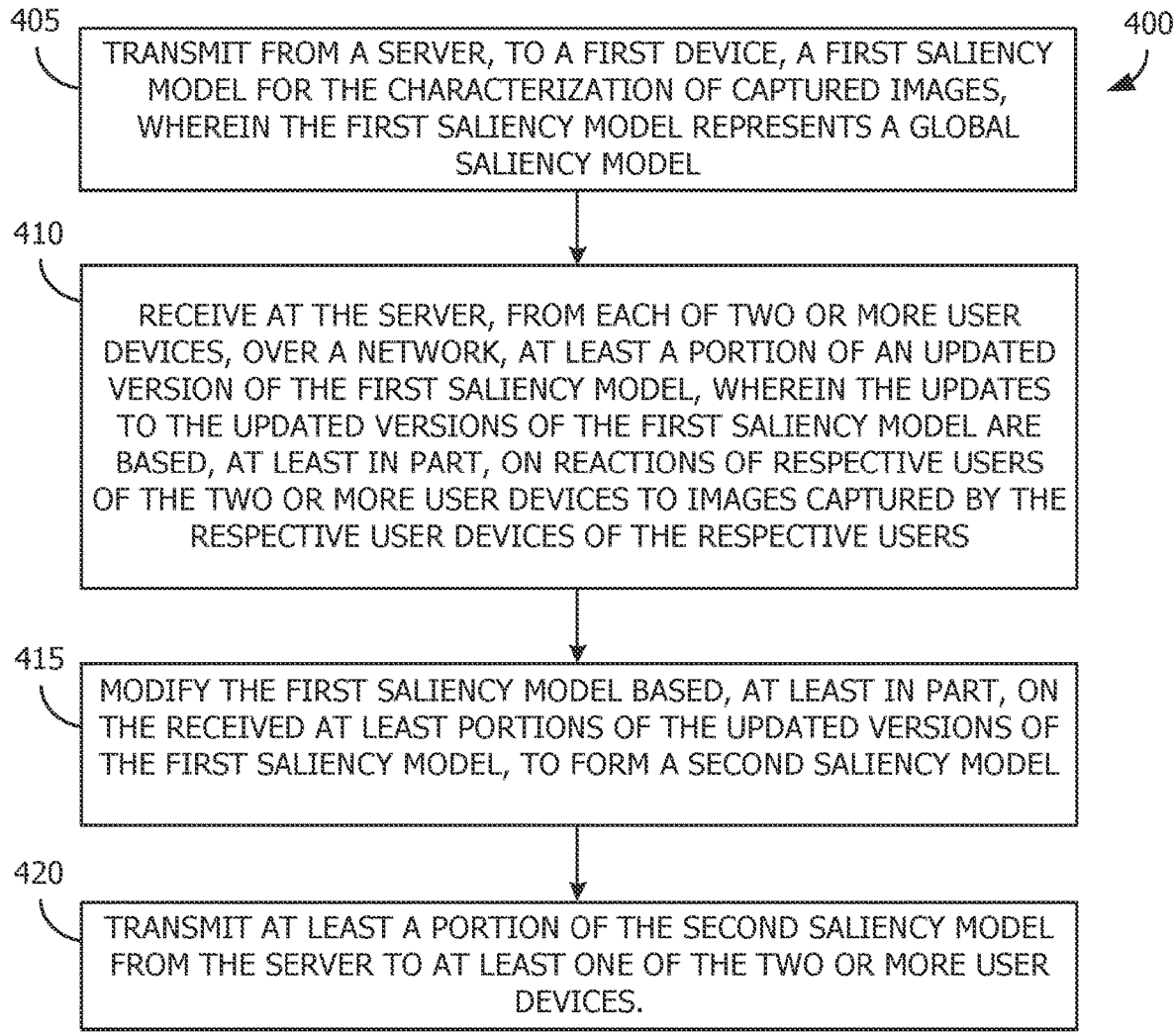
FIG. 4 shows a flowchart in which a global saliency model is updated at a server, according to one or more embodiments.

Referring now to FIG. 4, a flowchart 400 is illustrated, in which a global saliency model is updated at a server, according to one or more embodiments. The method 400 begins at Step 405, where a server(s) may transmit, to a first device, a first saliency model for the characterization of captured images, wherein the first saliency model represents a global saliency model. Next, at Step 410, the server(s) may receive, from each of two or more user devices, over a network, at least a portion of an updated version of the first saliency model, wherein the updates to the updated versions of the first saliency model are based, at least in part, on reactions of respective users of the two or more user devices to images captured by the respective user devices of the respective users.

Next, at Step 415, the server(s) may modify the first saliency model based, at least in part, on the received at least portions of the updated versions of the first saliency model, to form a second saliency model. In some embodiments, the output of the first saliency model and/or the second saliency model may comprise a multi-dimensional saliency map, as described above. Likewise, similar supervised learning techniques may be employed at the server when modifying the first saliency model, such that at least one dimension of the multi-dimensional saliency map has a known semantic meaning, as also described above.

Finally, at Step 420, the server(s) may transmit at least a portion of the second saliency model to at least one of the two or more user devices. In some embodiments, the transmission of at least a portion of the second saliency model to at least one of the two or more user devices may take place at one of the following times: a predetermined time; after a predetermined time interval has passed since a previous transmission; an on-demand time; or a configurable time. In other embodiments, modifying the first saliency model may further comprise the server(s) performing an averaging operation (or other desired combining operation) on at least some of the at least a portion of an updated version of the first saliency model.

Figure 5:
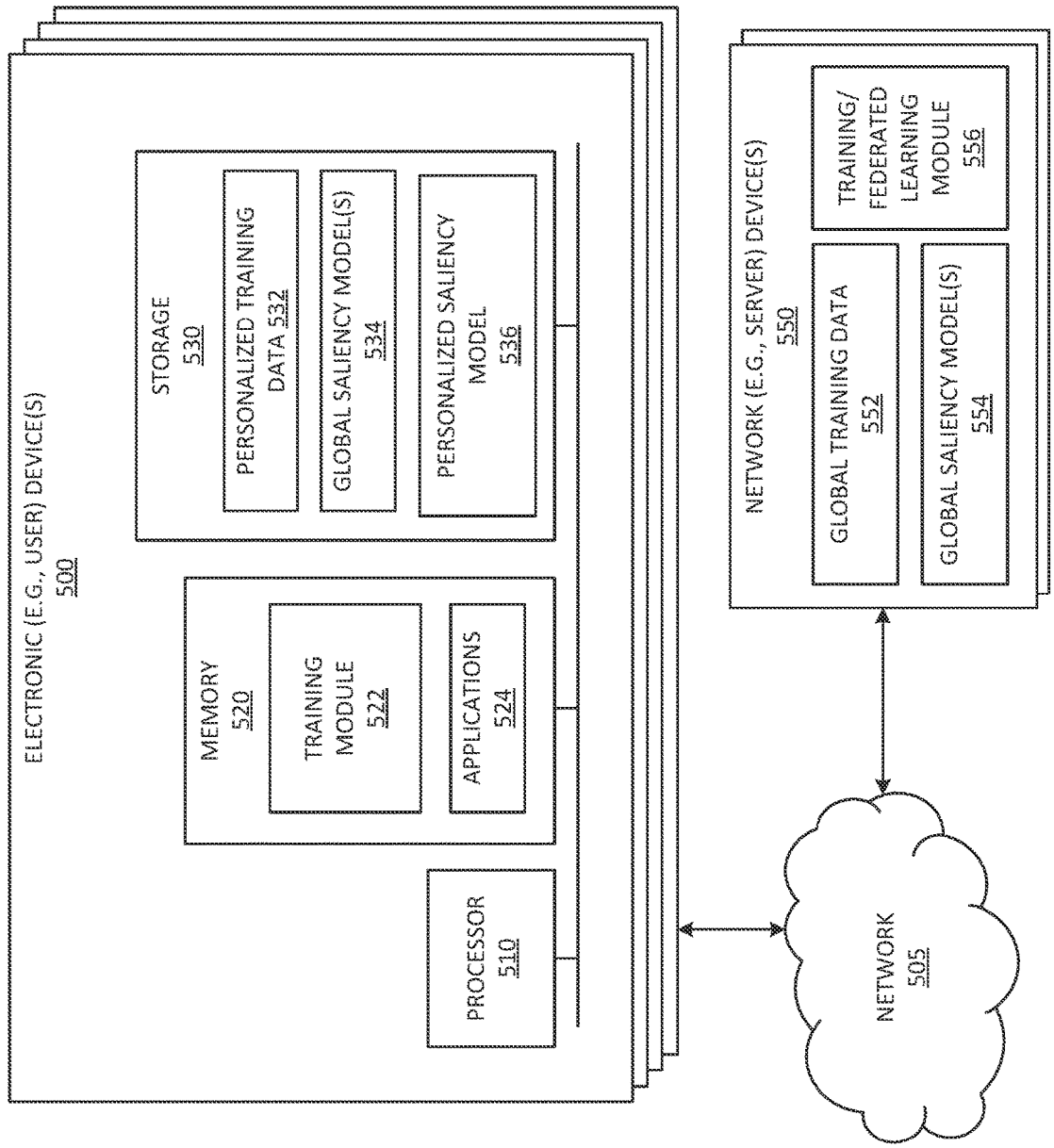
FIG. 5 shows a simplified system diagram, according to one or more embodiments.

Exemplary User Devices and Servers for Providing Global and Personalized Saliency Models Referring to FIG. 5, a simplified block diagram of an electronic device 500 (e.g., a user device) is depicted, communicably connected to a network device 550 (e.g., a server) over a network 505, in accordance with one or more embodiments of the disclosure. It is to be understood that the scenario illustrated in FIG. 5 may be repeated across two or more electronic devices, each communicating with one (or more) server devices.

Electronic device 500 may be part of a multifunctional device, such as a mobile phone, tablet computer, personal digital assistant, portable music/video player, wearable device, base station, laptop computer, desktop computer, network device, or any other electronic device. Electronic device 500 and network device 550 may additionally, or alternatively, include one or more other user devices or other network computing devices, within which the various functionality may be contained, or across which the various functionality may be distributed. Electronic device 500 may be connected to the network device 550 across a network 505. Illustrative networks include, but are not limited to, a local network such as a universal serial bus (USB) network, an organization's local area network, and a wide area network such as the Internet. According to one or more embodiments, electronic device 500 may be configured to provide, create, utilize, and/or update personalized saliency models, which models may be used to modify one or more operations (e.g., the presentation of image or video data) performed by the electronic device 500. It should be understood that the various components and functionality within electronic device 500 and network device 550 may be differently distributed across the devices or may be distributed across additional devices.

Electronic device 500 may include processor, such as a central processing unit (CPU) 510. Processor 510 may be a system-on-chip, such as those found in mobile devices, and may also include one or more graphics processing units (GPUs). Further, processor 510 may include multiple processors of the same or different types. Electronic device 500 may also include a memory 520. Memory 520 may include one or more different types of memory, which may be used for performing device functions in conjunction with processor 510. For example, memory 520 may include cache, ROM, RAM, or any kind of transitory or non-transitory computer readable storage medium capable of storing computer readable code. Memory 520 may store various programming modules for execution by processor 510, including training module 522 and any number of applications 524. Electronic device 500 may also include storage 530. Storage 530 may include one more non-transitory or non-volatile computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM).

Storage 530 may be utilized to store various data and structures, which may be utilized in performing the disclosed techniques for creating, utilizing, and/or updating personalized saliency models. Storage 530 may include, for example, personalized training data 532. Personalized training data 532 may include, for example, images, videos, audio, or other content that are captured by electronic device 500, and from which various personalized saliency models may be trained. For example, in real-time, or at scheduled or configurable time intervals, the electronic device 500 may automatically (or through user interaction) determine the user's response to certain content captured by the electronic device 500. E.g., as described in the examples of FIGS. 1 and 2 above, if electronic device 500 recognizes a face in an image captured by electronic device 500, that recognition may be used by training module 522 to train a user of the electronic device 500's personalized saliency model (e.g., personalized saliency model 536), such that later-captured images of the recognized person may likewise be highlighted (or otherwise emphasized) to the user of the electronic device 500 as likely being salient. Similarly, one or more feedback signals may be measured from the user of the electronic device 500 during (or after) the capture and/or viewing of images (e.g., feedback signals indicative of user reactions manifested in the user's heart rate, stress level, emotion, eye gaze location, body temperature, blood pressure, interactions with a user interface of the electronic device 500, and/or verbal utterances made by the user, etc.), which feedback signals may be used to inform training module 522 to train the user of the electronic device 500's personalized saliency model 536.

In still other instances, a user of the electronic device 500 may confirm, e.g., via a user interface, whether or not certain images, portions of images, audio, persons, contexts, scenes, locations, interactions, etc., were of a salient nature to the user. In some embodiments, a user may opt out of the collection of personalized training data 532 for use by training module 522 to update the user's personalized saliency model 536, and simply use one or more global saliency model(s) 534, which may be obtained from a network device 550, as explained above. In such embodiments, a user's saliency model will simply provide the user with a global sense of the images, portions of images, audio, persons, contexts, scenes, locations, interactions, etc., that would be deemed salient to an "average" user (e.g., as determined during an offline training process at the network device, using captured images and feedback signals from large numbers of users aggregated, preferably over long periods of time), i.e., without taking the user's personal preferences and reactions into account.

As mentioned above, storage 530 may also include one or more global saliency model(s) 534. The one or more global saliency model(s) 534 may include, for example, saliency models trained on images, videos, or other data that has not necessarily been captured by the user of the electronic device 500, but has instead been generated from images, videos, or other data captured, analyzed, reacted to, etc., by large numbers of other users, preferably aggregated over long periods of time, such that the global saliency model(s) 534 may have more sophisticated understandings of scene context and historical relevance of certain content to broad numbers of users, and such that it may do a good job at recognizing content that would 'generally' be viewed as salient across a population(s).

In embodiments were a personal electronic device 500 may store more than one global saliency model 534, each such global saliency model may have been trained using a different subset of collected information and feedback, e.g., a global saliency model tailored for a specific demographic group (e.g., females over the age of 65), certain professions (e.g., dentists), certain activities (e.g., attending a tennis match), and/or certain geographic regions (e.g., European users), etc. As such, a user may "switch between" different global saliency models 534 as desired, e.g., to view the world "through the eyes of another," e.g., by seeing what content in captured images, video, audio, etc., would be relevant or salient to someone of a different demographic group, profession, geographic region, or performing a certain activity, etc. As mentioned above, if desired, each global saliency model 534, may be further customized and trained over time, e.g., by training module 522, based on a user's own preferences and reactions to captured and/or viewed content, thereby resulting in the development of one or more additional personal saliency models 536, which may or may not be contributed back to a relevant global saliency model(s).

Electronic device(s) 500 may be connected to one or more network device(s) (e.g., servers) 550 across a network 505. In some embodiments, the network device 550 may be used to store global training data 552 and/or one or more global saliency models 554. As described above, global training data 552 may preferably comprise training data (e.g., images, video, audio, etc.) collected and compiled offline from large numbers of diverse groups of users, aggregated over long periods of time, wherein such training data is also associated with "ground truth" indications of the portions of the respective training data that each user found to be salient. Using such global training data 552, one or more global saliency models 554 may be developed. As described above, in some embodiments, it may be beneficial to have more than one "global" saliency model 554, such that individual global saliency models 554 may be trained and tailored to identify content that is most likely to be deemed salient to, e.g., certain demographic groups, professions, activities, and/or geographic regions, etc. In such cases, a network device 550 may, e.g., distribute to each electronic device 500: the broadest-based global saliency model stored at (or otherwise available) to the network device 550; one or more tailored global saliency models (e.g., for a particular demographic group); all global saliency models stored at (or otherwise available to) the network device 550; and/or global saliency models specifically requested and/or matching the properties or criteria of a specific user of a particular electronic device.

According to some embodiments, it may also be beneficial for the network device(s) 550 to update, modify, or otherwise improve its global saliency models 554 over time, e.g., with information received from consenting users of electronic devices utilizing the personalized saliency model techniques described herein. In some cases, the network device(s) 550 may utilize a training/federated learning module 556 to perform process known as "federated learning" in order to continue to train and improve its global saliency models 554 over time.

According to some embodiments, the process of federated learning may comprise multiple devices working together to collaboratively learn a shared model (e.g., a shared saliency prediction model, in the context of the techniques disclosed herein), while keeping each user's individual training data on their individual electronic device 500, thereby obviating the need for users to send their personal data to a network device 550, in order to obtain the benefits of machine learning.

In some embodiments, a federated learning process may proceed as follows: 1.) a particular electronic device 500 may download or otherwise obtain a current model (e.g., one of the global saliency model(s) 554, described above); and then 2.) improve the obtained global saliency model, e.g., using the personalized training data 532 and training module 522 of the particular electronic device 500, thus generating an updated personalized saliency model 536 (if desired); before finally 3.) summarizing the changes and updates made by the particular electronic device 500 to the obtained global saliency model(s) 554 in the form of a small update file (e.g., a so-called "diff" or "delta" file).

In order to protect the user's privacy, while simultaneously reducing latency and power consumption, only the small update file may be sent to the network device 550, e.g., using encrypted communications for further data protection, wherein the small update file may be averaged with other user updates received at the network device 550 over time, and used by the network device 550 to improve the respective global saliency model(s) 554. In some embodiments, for yet further user privacy and data protection, additional "noise" information noise may be added to the small update file before being transmitted to the network device 550, thereby further limiting any ability of the network device 550 to reconstruct privacy-sensitive aspects of any individual user's personalized training data 532 that was used to improve the global saliency model.

Although the various components described within storage 530 are depicted as being within a single storage, it should be understood that the various components, or data within the components, may be distributed across multiple storage devices, or even across multiple electronic devices, for example across a network. Similarly, although electronic device 500 and network device 550 are depicted as comprising the numerous components described above, in one or more embodiments, the various components may be distributed across multiple devices of each type. Accordingly, although certain receiving and transmitting of information is described herein with respect to the particular systems as depicted, in one or more embodiments, the various transmissions may be made differently, depending on the distributed functionality of the various devices in the system. Further, additional components (such as those described below with reference to FIG. 6) may be used, and some combination of the functionality of any of the components may be combined.

Exemplary Multifunction Electronic Device

Figure 6:
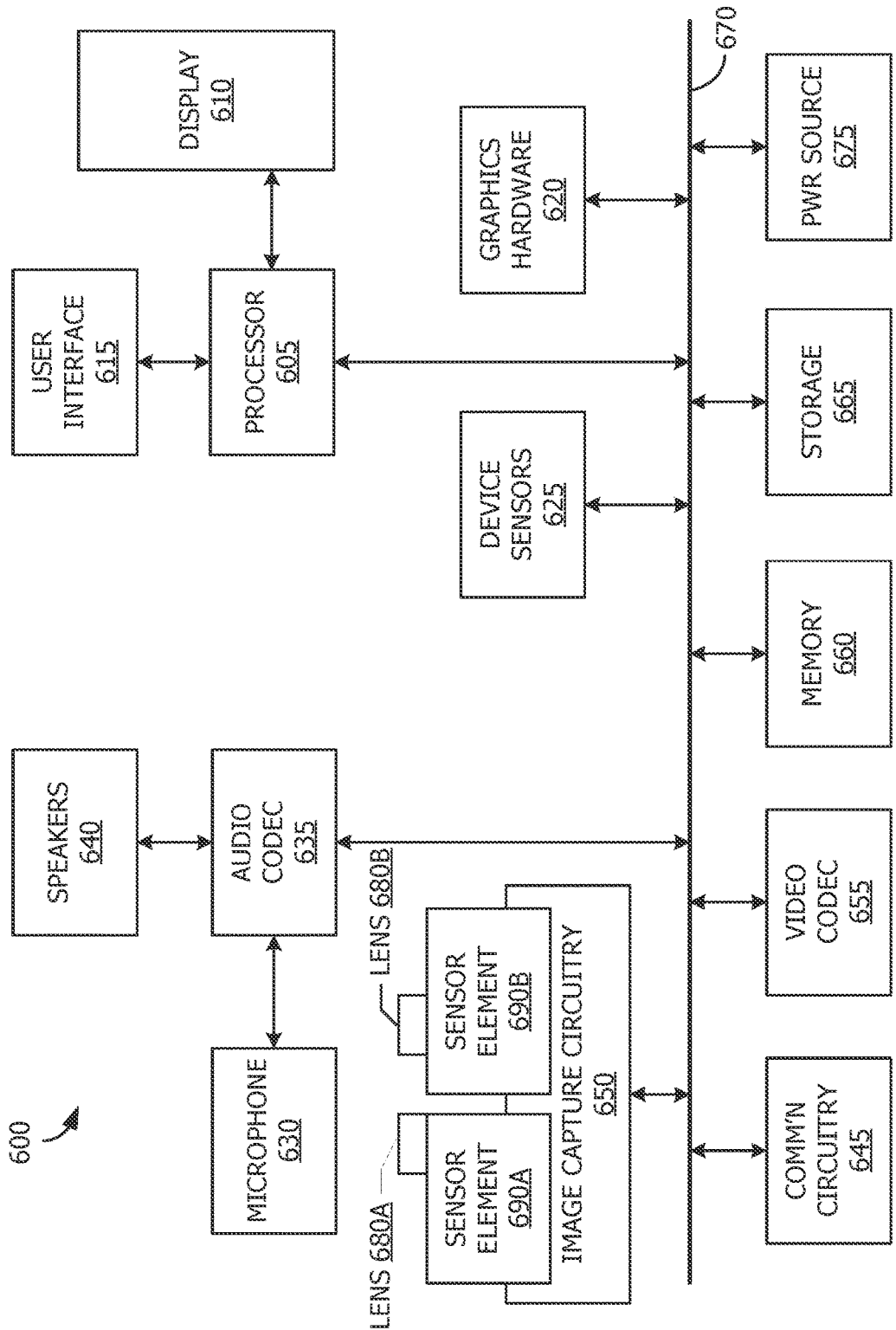
FIG. 6 shows, in block diagram form, a computer system, according to one or more embodiments.

Referring now to FIG. 6, a simplified functional block diagram of illustrative multifunction electronic device 600 is shown according to one embodiment. Each of electronic devices may be a multifunctional electronic device or may have some or all of the described components of a multifunctional electronic device described herein. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture circuitry 650 (e.g., including a video or still camera imaging system, or any other type of image capture device) video codec(s) 655 (e.g., in support of the image capture devices), memory 660, storage device 665, power source 675, and communications bus 670. Multifunction electronic device 600 may be, for example, a digital camera or a personal electronic device such as a personal digital assistant (PDA), personal music player, mobile telephone, tablet computer, or other wearable electronic device.

Processor 605 may execute instructions necessary to carry out or control the operation of many functions performed by device 600 (e.g., such as the generation and/or processing of saliency models, as disclosed herein). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include one or more dedicated graphics processing units (GPUs). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include one or more programmable GPUs.

Image capture circuitry 650 may include two (or more) lens assemblies 680A and 680B, where each lens assembly may have a separate focal length. For example, lens assembly 680A may have a shorter focal length relative to the focal length of lens assembly 680B. Each lens assembly may have a separate associated sensor element 690. Alternatively, two or more lens assemblies may share a common sensor element. Image capture circuitry 650 may capture still and/or video images. Output from image capture circuitry 650 may be processed, at least in part, by video codec(s) 655 and/or processor 605 and/or graphics hardware 620, and/or a dedicated image processing unit or pipeline incorporated within circuitry 650. Images so captured may be stored in memory 660 and/or storage 665.

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory or non-volatile computer-readable storage mediums including, for example, magnetic disks (fixed, floppy, and removable) and tape, optical media such as CD-ROMs and digital video disks (DVDs), and semiconductor memory devices, such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605, such computer program code may implement one or more of the methods described herein. Power source 675 may comprise a rechargeable battery (e.g., a lithium-ion battery, or the like) or other electrical connection to a power supply, e.g., to a mains power source, that is used to manage and/or provide electrical power to the electronic components and associated circuitry of device 600.

As described above, one or more aspects of the present technology may involve the use of data gathered from various sources to jointly solve the tasks at hand. The present disclosure contemplates that, in some instances, this gathered data may include personal information data that uniquely identifies or can be used to contact or locate a specific person. Such personal information data can include demographic data, location-based data, telephone numbers, email addresses, social network-related information, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better train various models. Further, other uses for personal information data that benefit the user are also contemplated by the present disclosure. For instance, health and fitness data may be used to provide insights into a user's general wellness—or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIG. 3 or 4, or the arrangement of elements shown in FIGS. 5 and 6 should not be construed as limiting the scope of the disclosed subject matter. The scope of the invention therefore should be determined with reference to the appended claims, along with the full scope of equivalents to which such claims are entitled.

The invention claimed is:

1. A method, comprising:
obtaining from a server, by a first device, a first saliency model for the characterizing of captured images, wherein the first saliency model represents a global saliency model comprising a combination of two or more saliency models;
capturing a first plurality of images by the first device;
obtaining information indicative of a reaction of a first user of the first device to one or more images of the first plurality images captured by the first device;
updating the first saliency model based, at least in part, on the obtained information to form a personalized, second saliency model; and
transmitting at least a portion of the second saliency model to a second user of a second device for use in modifying at least one image captured by the second device.

2. The method of claim 1, wherein the information indicative of the reaction of the first user is obtained:
concomitantly with the capture of the one or more images of the first plurality of images;
subsequently to the capture of the one or more images of the first plurality of images;
at a predetermined time interval; or
at a configurable time interval.

3. The method of claim 1, wherein an appropriateness detector is applied to the portion of the second saliency model before being transmitted.

4. The method of claim 1, wherein a first amount of noise is added to the portion of the second saliency model before being transmitted.

5. The method of claim 1, further comprising:
capturing a second plurality of images by the first device; and
modifying at least one of the second plurality of images for display by the first device based, at least in part, on an application of the second saliency model to the at least one of the second plurality of images.

6. The method of claim 5, wherein modifying at least one of the second plurality of images comprises performing at least one of the following operations on at least one of the second plurality of images:
adding contextual information;
adding visual highlighting;
adding stylization;
changing one or more of a color or brightness component;
blurring;
compressing;
emphasizing; or
deemphasizing.

7. The method of claim 1, wherein updating the first saliency model further comprises:
updating the first saliency model using a long term attention module, wherein the long term attention module is configured to make saliency determinations for a given image based, at least in part, on information obtained from a source other than the given image.

8. The method of claim 1, wherein an output of the first saliency model comprises: a multi-dimensional saliency map.

9. The method of claim 8, wherein updating the first saliency model further comprises:
updating the first saliency model using a supervised learning technique, wherein at least one dimension of the multi-dimensional saliency map has a known semantic meaning.

10. The method of claim 1, further comprising:
obtaining from the server, by the first device, a third saliency model for the characterizing of captured images, wherein the third saliency model represents an updated global saliency model with respect to the first saliency model;
capturing a second plurality of images by the first device; and
modifying at least one of the second plurality of images for display by the first device based, at least in part, on an application of the third saliency model to the at least one of the second plurality of images.

11. The method of claim 1, wherein the reaction of the first user of the first device to the capture of at least one of the one or more images of the first plurality images comprises at least one of the following:
a change in heart rate;
a change in stress level;
an emotional reaction;
a change in body temperature;
a change blood pressure;
an interaction with a user interface element of the first device; or
a verbal utterance.

12. A non-transitory computer readable medium comprising computer readable instructions executable by one or more processors to:
obtain from a server, by a first device, a first saliency model for the characterizing of captured images, wherein the first saliency model represents a global saliency model comprising a combination of two or more saliency models;
cause the first device to capture a first plurality of images;
obtain information indicative of a reaction of a first user of the first device to one or more images of the first plurality images captured by the first device;
update the first saliency model based, at least in part, on the obtained information to form a personalized, second saliency model; and
cause the first device to transmit at least a portion of the second saliency model to a second user of a second device for use in modifying at least one image captured by the second device.

13. The non-transitory computer readable medium of claim 12, wherein the computer readable instructions are further executable by the one or more processors to:
apply an appropriateness detector to the portion of the second saliency model before being transmitted.

14. The non-transitory computer readable medium of claim 12, wherein the computer readable instructions are further executable by the one or more processors to:
add a first amount of noise to the portion of the second saliency model before being transmitted.

15. The non-transitory computer readable medium of claim 12, wherein the computer readable instructions are further executable by the one or more processors to:
cause the first device to capture a second plurality of images; and
modify at least one of the second plurality of images for display by the first device based, at least in part, on an application of the second saliency model to the at least one of the second plurality of images.

16. A system, comprising:
a display;
one or more processors;
one or more image capture devices; and
one or more computer readable medium comprising computer readable instructions executable by one or more processors to:
obtain, from a server, a first saliency model for characterizing captured images, wherein the first saliency model represents a global saliency model comprising a combination of two or more saliency models;
capture a first plurality of images using at least one of the one or more image capture devices;
obtain information indicative of a reaction of a first user of the system to one or more images of the first plurality images captured by the one or more image capture devices;
update the first saliency model based, at least in part, on the obtained information to form a personalized, second saliency model; and
transmit at least a portion of the second saliency model to a second user of a second device for use in modifying at least one image captured by the second device.

17. The system of claim 16, wherein the computer readable instructions executable to cause the one or more processors to update the first saliency model further comprise computer readable instructions executable to cause the one or more processors to:
update the first saliency model using a long term attention module, wherein the long term attention module is configured to make saliency determinations for a given image based, at least in part, on information obtained from a source other than the given image.

18. The system of claim 16, wherein an output of the first saliency model comprises: a multi-dimensional saliency map.

19. The system of claim 18, wherein the computer readable instructions executable to cause the one or more processors to update the first saliency model further comprise computer readable instructions executable to cause the one or more processors to:
update the first saliency model using a supervised learning technique, wherein at least one dimension of the multi-dimensional saliency map has a known semantic meaning.

20. The system of claim 18, wherein the computer readable instructions further comprise computer readable instructions executable to cause the one or more processors to:
obtain, from the server, a third saliency model for characterizing captured images, wherein the third saliency model represents an updated global saliency model with respect to the first saliency model;
capture a second plurality of images using at least one of the one or more image capture devices; and
modify at least one of the second plurality of images for presentation on the display based, at least in part, on an application of the third saliency model to the at least one of the second plurality of images.

\* \* \* \* \*